J. A. PERKINS.
AXLE THRUST BEARING.
APPLICATION FILED OCT. 27, 1910. RENEWED DEC. 3, 1914.
1,124,944.
Patented Jan. 12, 1915.
2 SHEETS—SHEET 2.
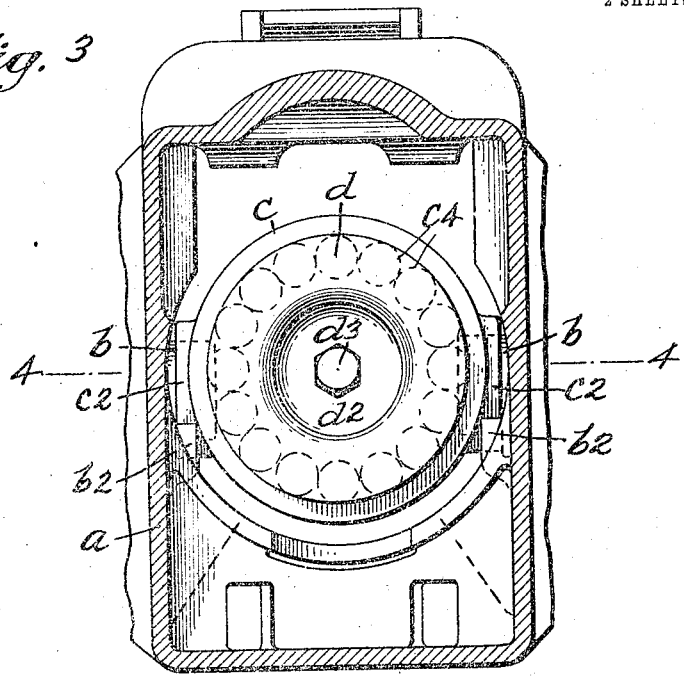
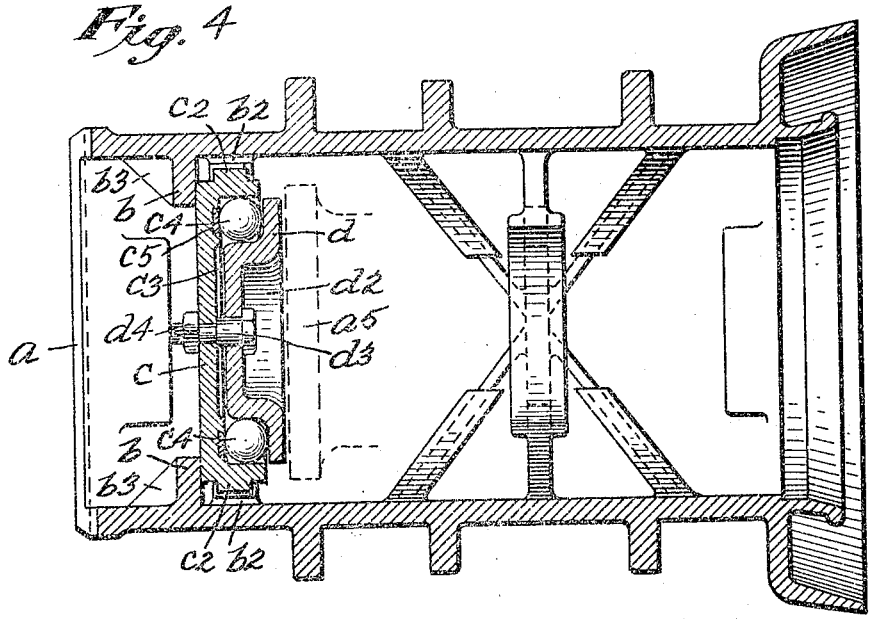
Attest:
Inventor:
by Julius A. Perkins
J. Chris Lars
Atty

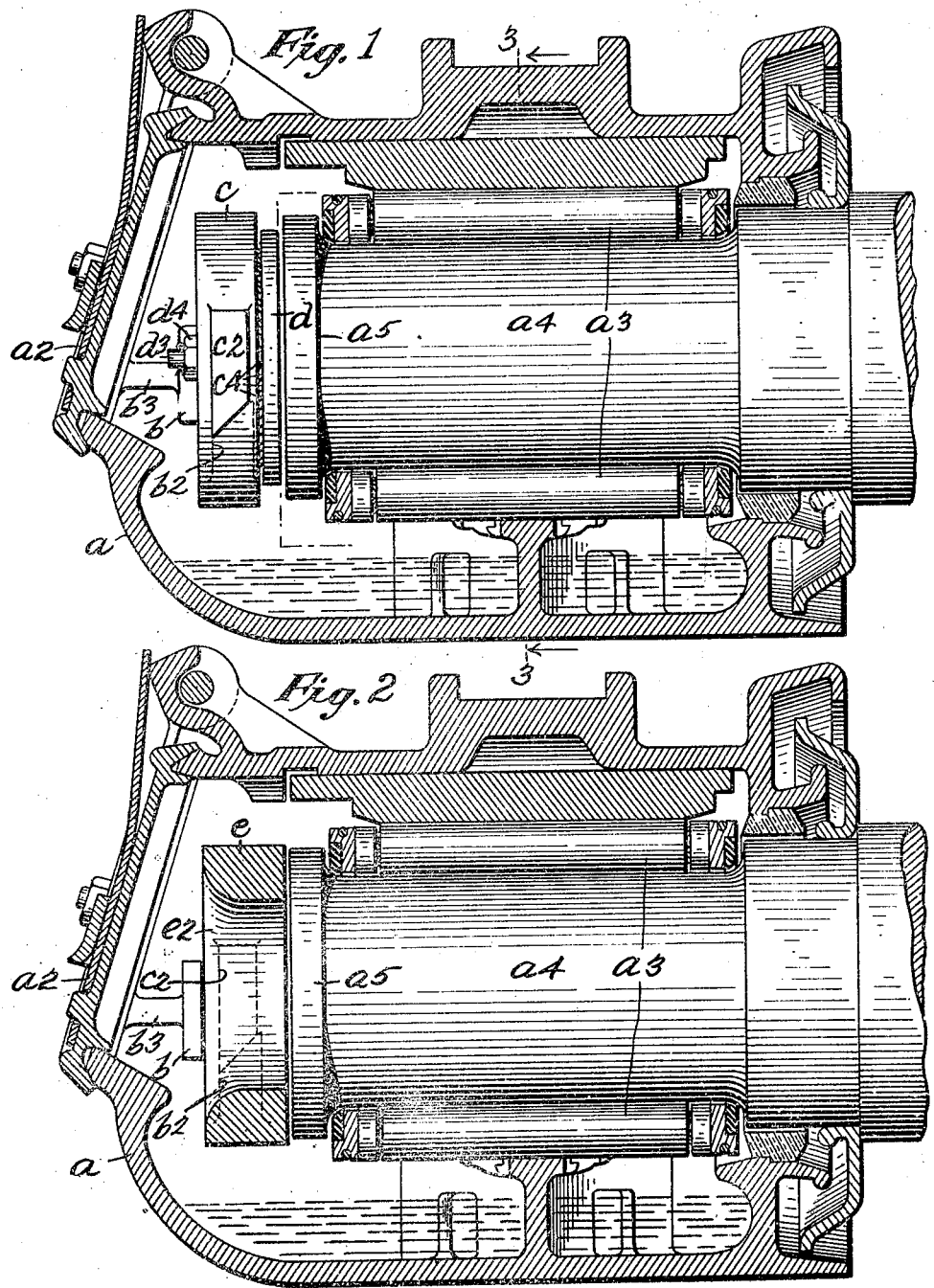

UNITED STATES PATENT OFFICE.

JULIUS A. PERKINS, OF OMAHA, NEBRASKA, ASSIGNOR TO HERBERT E. DICKSON, TRUSTEE, OF NEW YORK, N. Y.

AXLE THRUST-BEARING.

1,124,944.   Specification of Letters Patent.   Patented Jan. 12, 1915.

Application filed October 27, 1910, Serial No. 589,371.   Renewed December 3, 1914.   Serial No. 875,384.

*To all whom it may concern:*

Be it known that I, JULIUS A. PERKINS, a citizen of the United States of America, and residing at Omaha, in the county of Douglas and State of Nebraska, have invented certain new and useful Improvements in Axle Thrust-Bearings, of which the following is a specification, such as will enable those skilled in the art to which it appertains to make and use the same.

This invention relates to axle thrusts, particularly in car journal boxes, and the object thereof is to take up the said thrust anti-frictionally.

A further object is to make the said thrust devices readily removable for substitution or repair.

A further object is to provide, in car journal boxes, efficient means for maintaining the thrust devices in operative position, said means not interfering in any way with the installation or removal of the usual elements in such boxes.

A still further object is to so construct the said thrust device holding means as to be adaptable to a frictional thrust device if necessary or desirable for any reason.

A further object is to make the said thrust device of such dimensions as to prevent its removal when the axle is in position in the box.

A further object is to so construct the holding means, within the box, as to prevent the lodging of refuse or other matter therein whereby the true seating of the thrust device might be interfered with, thus positively insuring a predetermined positioning thereof, this being of the highest importance when an anti-frictional thrust is employed for the reason that the said thrust must be maintained in constant concentricity with the axle end; and a still further object is to provide such devices which are simple in construction, highly efficient in operation, readily installed and removed, and comparatively inexpensive.

My invention is fully set forth in the following specification, of which the accompanying drawings form a part, in which the separate parts are designated by the same reference characters in each of the views, and in which:—

Figure 1 is a vertical section taken through a car journal box provided with my axle thrust device; Fig. 2 is a similar view but showing a substitute, frictional, thrust device for emergencies; Fig. 3 is a section taken approximately on the line 3—3 of Fig. 1; and Fig. 4 is a section taken on the line 4—4 of Fig. 3.

In the drawings forming a part of this application, I have shown a car journal box $a$, of the usual or any desired form, provided with a cover $a^2$, and bearings $a^3$ for the journal of an axle $a^4$ having the usual flanged end $a^5$.

Secured at either side of the box interior, preferably integrally, is an abutment plate $b$, adjacent to the axle end $a^5$, said plates being vertically arranged and extending but a short distance toward the box center, and arranged beneath each of the said plates and inwardly thereof is a supporting lug $b^2$ having a downwardly and outwardly inclined upper surface and, in practice, I prefer to provide strengthening ribs $b^3$ for the plates $b$, and it will be observed, by reference to Fig. 3, that the lugs $b^2$ do not extend as far beyond the box wall as the plates $b$ for a reason hereinafter pointed out.

My present preferred form of thrust device, as shown in Figs. 1, 3 and 4, comprises a block $c$ provided with an ear $c^2$ on each side thereof having inclined lower surfaces corresponding to the inclined surfaces on the lugs $b^2$ and with which they are adapted to engage, the weight of the said block also holding the same against the plates $b$, because of the said incline, but in a readily detachable manner.

The block $c$ is recessed on its inner face, as shown at $c^3$, to a depth approximately equal to the diameter of a series of balls $c^4$ arranged therein and, in practice, I prefer to provide a hardened bearing ring $c^5$ for the said balls secured in the said block in any desired manner, and said balls are held in position by means of a disk $d$ having a central depression $d^2$ of an external diameter about equal to the diametrical distance between the balls, said disk being held in position by means of a bolt $d^3$ and a nut $d^4$, or equivalent, permitting its rotation, the under surface of the disk bearing directly on the balls as is clearly shown in Fig. 4.

In Fig. 2 I have shown an alternate or emergency form of thrust device, comprising merely a block $e$ provided also with ears in the manner of the block $c$, only one of said ears being indicated, and I may lighten the block $e$ by boring, as shown at $e^2$, this device being frictional whereas the form hereinbefore described is anti-frictional, the block $e$ being stored in stations, shops, or the like, for use in case of collisions or other accidents wherein the anti-frictional device is injured or destroyed.

It will thus be seen that I provide a readily detachable axle thrust device, the holding means wherefor do not, in any way, interfere with the normal functions of the box $a$ or contained elements, the normal thrust device being perfectly anti-frictional, and the said holding means are also adaptable to the emergency, frictional, thrust device shown, or to any suitable modification thereof; my anti-frictional thrust device is very simple in construction, perfectly efficient, possesses great strength, is comparatively inexpensive and, being composed of but few parts, cannot readily get out of order to require repair, nor do my thrust device holding means add materially to the cost of the box.

The blocks $c$ and $e$ are made of a diameter nearly as great as the box interior, as shown in Fig. 4, and the lugs $b^2$ are therefore necessarily shorter than the plates $b$, the latter extending inwardly of the block periphery in order to serve as a support therefor, this diameter of the block preventing, because of the height of the incline of the said lugs, from being displaced therefrom through the medium of the box top against which the said block strikes in the jolting of the car when in motion, said block being removable only after the axle has been removed, thus preventing workmen or curious persons from removing the thrust device, which removal might result in the loss of or injury to the same.

By reference to Fig. 2 it will be observed that there is a clear space provided between the abutment plates $b$ and the lugs $b^2$, permitting refuse or other matter to pass downwardly into the box and thus preventing the lodgment thereof on the said lugs to interfere with the true seating of the ears $c^2$, for it is very essential that the thrust be always maintained in exact relationship with the axle end, particularly when anti-frictional thrust means are employed, these requiring that an absolute concentricity be maintained between the same and the axle end.

While I have shown a preferred method of producing the desired results, it will be evident that changes thereover may suggest themselves and still be within the scope of my invention and the following claims and, Having fully described my invention, what I do claim as new and desire to secure by Letters Patent, is:—

1. In a journal box having an axle therein, an axle thrust device arranged in the plane of and closely adjacent the axle end, said device comprising a block having ears on the sides thereof inclined on their lower faces, supporting lugs, in said box, similarly inclined for said ears, and means in said box for limiting the downward and outward movement of said ears on said lugs, said lugs and limiting means being spaced apart to permit the passage of refuse therebetween.

2. In a journal box having an axle therein, an axle thrust device arranged in the plane of and closely adjacent the axle end, said device comprising a block having ears on the sides thereof, inclined on their lower faces, supporting lugs in said box, similarly inclined, for said ears, and an abutment plate on each side of said box for limiting the movement of said ears on said lugs, said plates taking the impact of said device in the axle thrust, said lugs and abutment plates being spaced apart to permit the passage of refuse therebetween.

3. In a journal box having an axle therein, and provided with inclined supporting lugs on either side of the interior thereof, and with abutment plates adjacent thereto and spaced apart therefrom to permit an unobstructed passage for refuse therebetween, an axle thrust device held on said lugs and comprising a block having ears on the sides thereof inclined similarly to said lugs and resting thereon, a disk rotatable on said block, and anti-frictional means interposed between said block and disk.

4. In a journal box having an axle therein, and provided with inclined supporting lugs on either side of the interior thereof, an axle thrust device comprising a block having ears on the sides thereof inclined similarly to and resting on said lugs, a disk rotatable on said plate, anti-frictional means interposed between said block and disk and means in said box for maintaining said block and connected elements in vertical position, said lugs and maintaining means being spaced apart to permit the passage of refuse therebetween.

5. In a journal box having an axle therein and provided with inclined supporting lugs on each side of the interior thereof, and with vertically arranged abutment plates adjacent to and distinct from said lugs, a block provided with ears on the sides thereof inclined similarly to and resting on said lugs, a disk rotatable on said block and anti-frictional means interposed between said block and disk, said disk taking the axle thrust anti-frictionally, and said abutment plates maintaining said block in vertical position, and preventing movement thereof in said thrust.

6. In a journal box having an axle therein and provided with interior inclined lugs and vertical abutment plates on either side thereof, a block having ears thereon for engagement with said lugs and inclined similarly thereto, said block bearing against said plates, a recessed disk, a bolt rotatably connecting said block and disk, and balls arranged between said block and disk for taking the axle thrust, said lugs and plates being spaced apart to provide an unobstructed passage therebetween.

In testimony that I claim the foregoing as my invention I have signed my name in presence of the subscribing witnesses this 20th day of October, 1910.

JULIUS A. PERKINS.

Witnesses:
GEORGE E. MUIR,
F. ELLIS BROWNE.